United States Patent
Nelson et al.

(10) Patent No.: US 9,603,448 B2
(45) Date of Patent: Mar. 28, 2017

(54) MODULAR SHELVING ASSEMBLY WITH UNIVERSAL DESIGN RATIO

(71) Applicant: SAC ACQUISITION LLC, Stamford, CT (US)

(72) Inventors: Shawn Nelson, Darien, CT (US); David Underwood, Norwalk, CT (US); Spencer Pearson, Herriman, UT (US); Justin Kruse, New York City, NY (US)

(73) Assignee: SAC ACQUISITION LLC, Stamford, CT (US)

( * ) Notice: Subject to any disclaimer, the term of this patent is extended or adjusted under 35 U.S.C. 154(b) by 0 days.

(21) Appl. No.: 13/834,284

(22) Filed: Mar. 15, 2013

(65) Prior Publication Data

US 2014/0251934 A1    Sep. 11, 2014

Related U.S. Application Data

(60) Provisional application No. 61/774,834, filed on Mar. 8, 2013.

(51) Int. Cl.
*A47B 47/00*    (2006.01)
*A47B 87/02*    (2006.01)
(Continued)

(52) U.S. Cl.
CPC ........ *A47B 47/0091* (2013.01); *A47B 47/047* (2013.01); *A47B 87/0207* (2013.01);
(Continued)

(58) Field of Classification Search
CPC .............. A47B 47/0091; A47B 47/047; A47B 2220/02; A47B 87/0253; A47B 87/00; A47B 87/0207; F16B 12/24
(Continued)

(56) References Cited

U.S. PATENT DOCUMENTS 129,688 A * 7/1872 Smith ........................... 312/107
1,148,238 A * 7/1915 Kline ........................... 312/329
(Continued)

FOREIGN PATENT DOCUMENTS

CH    192341 A  *  8/1937
CH    536089 A  *  4/1973
(Continued)

OTHER PUBLICATIONS

Pages from www.inewidea.com, printed on Feb. 20, 2012 (16 pages).
(Continued)

*Primary Examiner* — Stanton L Krycinski
(74) *Attorney, Agent, or Firm* — Workman Nydegger

(57) ABSTRACT

A modular shelving system includes at least two elongate U-shaped members, wherein each of the elongate U-shaped members includes: an elongate body member; and first and second parallel elongate leg members extending transversely in the same direction away from opposing ends of the elongate body member with space between the first and second parallel leg members, wherein the length A of the elongate U-shaped member is equal to twice the height B of the first side of the elongate U-shaped member, plus twice the height C of the second side of the elongate U-shaped member, such that A=2B+2C.

24 Claims, 8 Drawing Sheets

(51) Int. Cl.
*A47B 47/04* (2006.01)
*F16B 12/24* (2006.01)

(52) U.S. Cl.
CPC ............ *A47B 2220/02* (2013.01); *F16B 12/24* (2013.01); *Y10T 29/49826* (2015.01)

(58) Field of Classification Search
USPC ........ 211/186, 188, 189, 194, 183; 312/107, 312/108; 206/503, 504, 509
See application file for complete search history.

(56) References Cited

U.S. PATENT DOCUMENTS

| | | | | |
|---|---|---|---|---|
| 2,246,448 | A | * | 6/1941 | Mahan, Jr. .................... 432/259 |
| 2,456,481 | A | * | 12/1948 | Ballantyne et al. ............ 34/238 |
| 2,506,844 | A | * | 5/1950 | Smith ........................... 312/107 |
| 2,688,525 | A | | 6/1952 | Lindstrom |
| 3,234,896 | A | * | 2/1966 | Bonsall ........................... 108/60 |
| 3,549,020 | A | * | 12/1970 | Von Bohr ....................... 108/91 |
| 3,602,567 | A | | 8/1971 | Schnell et al. |
| 3,653,734 | A | * | 4/1972 | Ungaro ......................... 312/107 |
| 3,790,241 | A | * | 2/1974 | Messina ........................ 312/111 |
| 4,222,737 | A | * | 9/1980 | Jones ............................ 432/253 |
| 4,321,873 | A | * | 3/1982 | Nealis ............................. 108/91 |
| 4,325,596 | A | | 4/1982 | Bell |
| 4,681,378 | A | * | 7/1987 | Hellman, III .............. 312/223.2 |
| 5,492,399 | A | * | 2/1996 | Tillack .......................... 312/111 |
| 5,626,404 | A | | 5/1997 | Kelley et al. |
| 5,685,441 | A | * | 11/1997 | Calfee .......................... 211/194 |
| 6,216,894 | B1 | | 4/2001 | Hendricks |
| 6,230,909 | B1 | | 5/2001 | Suter |
| 6,749,070 | B2 | * | 6/2004 | Corbett et al. .................. 211/26 |
| 6,976,732 | B2 | | 12/2005 | Thomas et al. |
| 7,918,515 | B2 | * | 4/2011 | Wang ............................ 312/108 |
| 8,181,581 | B2 | * | 5/2012 | Meiners .......................... 108/64 |
| 8,297,206 | B2 | * | 10/2012 | Meiners .......................... 108/64 |
| 8,424,512 | B2 | * | 4/2013 | Dettloff ....................... 126/39 B |
| 8,567,615 | B1 | * | 10/2013 | Rainey ............................ 211/36 |
| 8,640,871 | B2 | * | 2/2014 | Moss ............................ 206/512 |
| 2003/0010738 | A1 | | 1/2003 | Hsia et al. |
| 2004/0206655 | A1 | * | 10/2004 | Bennett ......................... 206/503 |
| 2006/0207957 | A1 | * | 9/2006 | Chen ............................. 211/188 |
| 2011/0084042 | A1 | * | 4/2011 | Ahlert et al. .................. 211/194 |
| 2011/0220525 | A1 | * | 9/2011 | Moss ............................ 206/386 |
| 2011/0298340 | A1 | | 12/2011 | Nelson et al. |
| 2013/0015093 | A1 | * | 1/2013 | Dye .............................. 206/503 |

FOREIGN PATENT DOCUMENTS

| | | | | |
|---|---|---|---|---|
| DE | 2037073 | A1 | * | 2/1972 |
| DE | 2110892 | A1 | * | 10/1972 |
| DE | 2116745 | A1 | * | 10/1972 |
| DE | 2133223 | A1 | * | 1/1973 |
| DE | 2241048 | A1 | * | 3/1974 |
| DE | 2309573 | A1 | * | 9/1974 |
| DE | 2412945 | A1 | * | 10/1975 |
| DE | 102004054660 | A1 | * | 5/2006 |
| DE | 102011050790 | A1 | * | 12/2012 |
| EP | 1982620 | A1 | * | 10/2008 ............ A47B 87/02 |
| FR | 934631 | A | * | 5/1948 |
| FR | 1024597 | A | * | 4/1953 |
| FR | 1503595 | A | * | 12/1967 |
| FR | 1549597 | A | * | 12/1968 |
| FR | 2063621 | A5 | * | 7/1971 |
| FR | 2082044 | A5 | * | 12/1971 |
| FR | 2166506 | A5 | * | 8/1973 |
| FR | 2203266 | A5 | * | 5/1974 |
| FR | 2230268 | A5 | * | 12/1974 |
| FR | 2278291 | A1 | * | 2/1976 |
| FR | 2304307 | A1 | * | 10/1976 |
| FR | 2763486 | A1 | * | 11/1998 ............ A47B 47/03 |
| GB | 191213480 | A | * | 2/1913 |
| GB | 191325879 | A | * | 8/1914 |
| GB | 610632 | A | * | 10/1948 |
| GB | 1274438 | A | * | 5/1972 |
| GB | 1348416 | | | 3/1974 |
| GB | 1524175 | | | 9/1978 |
| GB | 1530129 | A | * | 10/1978 |
| JP | 02110071 | A | * | 4/1990 ............ B65H 31/00 |
| WO | 2006109178 | A1 | | 10/2006 |
| WO | 2008012053 | A3 | | 1/2008 |
| WO | WO 2011113434 | A1 | * | 9/2011 |

OTHER PUBLICATIONS

Pages from Homeklondike.com—Home Interior Design, Architecture and Decorating Ideas, printed on Feb. 20, 2012 (7 pages).
Pages from freshome.com Parenthetical Shelves Multiple Configurations and Uses, printed on Feb. 20, 2012 (6 pages).
Pages from www.thisnext.com Design Within Reach: Modular Shelving Unit by Sabrina and Dylan Jones, printed on Feb. 20, 2012 (15 pages).
Pages from 3rings.designerpages.com, printed on Jun. 26, 2012 (8 pages).
Pages from www.lovesac.com, printed on Mar. 7, 2013 (7 pages).
Pages from wanelo.com, printed on Mar. 4, 2013 (4 pages), publicly available, on information and belief, at least as early as Feb. 18, 2013.
Pages from bashko-trybek.com, printed on Mar. 4, 2013 (1 page), publicly available, on information and belief, at least as early as Feb. 18, 2013.
Pages from housefish.com, printed on Mar. 4, 2013 (4 pages), publicly available, on information and belief, at least as early as Feb. 18, 2013.
Pages from http://svpply.com, printed on Mar. 4, 2013 (6 pages), publicly available, on information and belief, at least as early as Feb. 18, 2013.
Pages from shoeboxdwelling.com, printed on Mar. 4, 2013 (4 pages), publicly available, on information and belief, at least as early as Feb. 18, 2013.
Pages from pinterest.com, printed on Mar. 4, 2013 (2 pages), publicly available, on information and belief, at least as early as Feb. 18, 2013.
Pages from www.lostateminor.com, printed on Mar. 4, 2013 (3 pages), publicly available, on information and belief, at least as early as Feb. 18, 2013.
Pages from www.ikea.com, printed on Mar. 4, 2013 (15 pages).
Pages from www.brickbox.es/bookshelf-stackable-modular-shelving-library, printed on Mar. 4, 2013 (2 pages), publicly available, on information and belief, at least as early as Feb. 18, 2013.
Photographs featuring Lovesac U-tables, which were publicly available and on sale, on information and belief, at least as early as 2011 (5 pages).
Photographs of Lovesac U-table assembly, publicly available and on sale, on information and belief, at least as early as Oct. 2012; assembly—pp. 1-12; top table of assembly—pp. 13-19; bottom table of assembly—pp. 20-26 (26 total pages).
Photographs of Lovesac U-table, publicly available and on sale, with identical or similar mating U-table, on information and belief, at least as early as Mar. 2012 (10 pages).
Clear U-Table, which was publicly available and offered for sale with identical or similar mating U-tables in the United States, on information and belief, at least as early as Feb. 2012 (5 pages of photographs).
Printed Acrylic U Table and associated packaging materials, which were publicly available and offered for sale with identical or similar mating U-tables in the United States, on information and belief, at least as early as Feb. 2012 (19 pages of photographs).
Printed Acrylic U Table and associated packaging materials, available and offered for sale, on information and belief, at least as early as Feb. 2012, and identical versions sold, at least as early as Feb. 2012 (19 pages of photographs).
Thettablog.blogspot.com, "Keeping Tabs on the TTAB" by John L. Welch, published, on information and belief, at least as early as Feb. 2011 (6 pages).
PDF image of table, which was publicly available, on information and belief, at least as early as 2011, 1 page.

(56) References Cited

OTHER PUBLICATIONS

Envelop Desk from Herman Miller, from materialicious.com, published, on information and belief, in 2010, printed Aug. 10, 2015, 5 pages.
Screen print, Envelop Desk from Herman Miller, published, on information and belief, in 2010, printed Aug. 11, 2015, 1 page.
Architonic Guide, New York 2016 from www.architonic.com, printed on May 11, 2016, 15 pages.
Screen prints of Architonic Guide from www.architonic.com, printed on May 11, 2016, 3 pages.
Pictures of Sactionals Furniture Side Cover Box, which was publicly available, on information and belief, at least as early as 2011, 4 pages.
Pictures of Sactionals Furniture Base Cover Box, which was publicly available, on information and belief, at least as early as 2011, 4 pages.

\* cited by examiner

RATIO OF SIDES TO TOP

MODULAR SHELVING ASSEMBLY WITH UNIVERSAL DESIGN RATIO

CROSS-REFERENCE TO RELATED APPLICATION

This application claims priority to and the benefit of U.S. Patent Application Ser. No. 61/774,834, filed Mar. 8, 2013, entitled MODULAR SHELVING ASSEMBLY WITH UNIVERSAL DESIGN RATIO, which is incorporated herein in its entirety by reference.

BACKGROUND OF THE INVENTION

1. The Field of the Invention

This invention is in the field of modular furniture and shelving.

2. The Relevant Technology

Modular furniture, including modular sofas, sectionals, shelving, bookcases, consuls, chairs and other modular furniture items are very useful and important furniture items in the marketplace in light of the ability to use various pieces in different configurations such that a variety of different furniture configurations can be formed from relatively few types of pieces. Modular furniture enables individuals to express their individuality, make decisions regarding furniture positioning in their own individual homes and businesses, and allows individuals to both save money on furniture expenses. Modular furniture also enables individuals in upper floor apartments and rooms to negotiate tight hallways and stairways as the pack furniture in smaller relative pieces to the desired locations.

A goal of sectional furniture is to avoid unnecessary expense and wasted space by providing pieces that can be used in a variety of different settings. It is therefore desirable to create and achieve the use of furniture pieces that can be more universally used as opposed to limiting the roles of existing furniture pieces.

BRIEF SUMMARY OF THE INVENTION

The modular shelving assembly of the present invention features a plurality of members using the same design, i.e., the design of an elongate U-shaped member having a universal design ratio that enables a user to form a vast array of shelving assemblies in a convenient and efficient manner using the single design. Using the design ratio of the present invention, an extensive number of practical shelving pieces can be created using space efficiently and effectively.

An advantage to the retail facility and factory, for example, is that the design of only a single piece can be molded, manufactured, stored, shipped, and sold in order to foster the creation of a wide variety of shelving designs. Vast numbers of the pieces having the same design can be stored in inventory for sale to customers. The customer can purchase and conveniently and efficiently assemble the multiple copies of the single design.

The modular shelving assembly of the present invention comprises elongate U-shaped members having the same size and design. Each of the U-shaped members comprises: (i) an elongate body member; and (ii) first and second parallel elongate leg members extending transversely away from the elongate body member, the first and second parallel elongate leg members extending in the same direction away from opposing ends of the elongate body member with space between the first and second parallel elongate leg members. The length A of the elongate U-shaped member is equal to twice the height B of the first side of the elongate U-shaped member plus twice the height C of the second side of the elongate U-shaped member. Thus $A=2B+2C$. Using this unique shelving design enables the creation of a vast array potential shelving configurations.

In one embodiment, the height B of the first side of the elongate U-shaped member is equal to the height C of the second side of the U-shaped member. Thus, in one such embodiment $A=4B=4C$.

In the universal design ratio of the present invention, each of the shelf members have a design ratio, wherein $A=2B+2C$. This design ratio enables various configurations of shelves, tables, consoles and/or bookshelves to be formed in a very efficient space saving manner using this single design ratio.

The design ratio of $A=2B+2C$ enables extensive numbers and types of shelving, consoles, bookshelves, table pieces, wall units and other shelving configurations using multiple pieces that all have the same common design unit, i.e., an elongate U-shaped member design wherein $A=2B+2C$. In one embodiment the elongate body has a width D wherein $A=2D$ such that various useful modular, space saving configurations can be formed.

The shelf bodies of the shelf members can be selectively oriented such that the shelf members are parallel to each other, perpendicular to each other, synchronized, and/or offset from each other to form an extensive number of useful modular configurations.

An embodiment of the present invention comprises a modular shelving system comprising at least two U-shaped members, each having the same design and size, wherein each of the U-shaped members comprises: (i) an elongate body member; and (ii) first and second parallel elongate leg members extending transversely away from the elongate body member, the first and second parallel elongate leg members extending in the same direction away from opposing ends of the elongate body member with space between the first and second parallel elongate leg members, wherein the length A of the elongate U-shaped member is substantially equal to twice the height B of the first side of the elongate U-shaped member plus twice the height C of the second side of the elongate U-shaped member, such that A is substantially equal to $2B+2C$; two, three, four, five, six, seven, eight, nine to thirty or more, or a wide variety of numbers of such U-shaped members may be employed in such a system, each having the same design and size.

The single design is versatile such that extensive copies of the same designed piece can be stored and used in a practical setting. Extensive multiplicities of designs are possible using multiple pieces have the same, single design. A variety of useful forms can be achieved using the same single design. More complex systems with more component pieces cannot be arranged in so many varied ways while still making use of each component as efficiently. There is a significant advantage to companies producing, stocking and selling multiple copies of the single design piece. The design of one piece can result in many different furniture assemblies.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The modular shelving assembly of the present invention features elongate U-shaped members having a universal design ratio that enables the shelf design to be used to form a vast array of furniture pieces in a convenient and efficient manner. Using the design ratio of the present invention, an extensive number of practical shelving pieces can be created using space efficiently and effectively. The modular shelving assembly of the present invention comprises at least two elongate U-shaped members having the same design ratio and size.

Figure 1A:
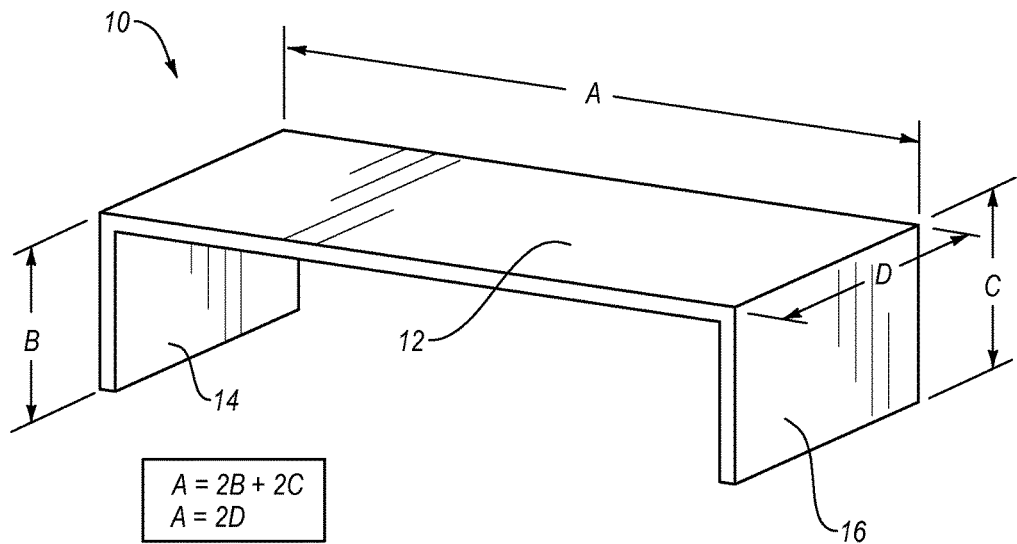
FIGS. 1A-B are perspective views of an elongate U-shaped member of the present invention having a design ratio A=2B+2C and a design ratio of A=2D.
Figure 1B:
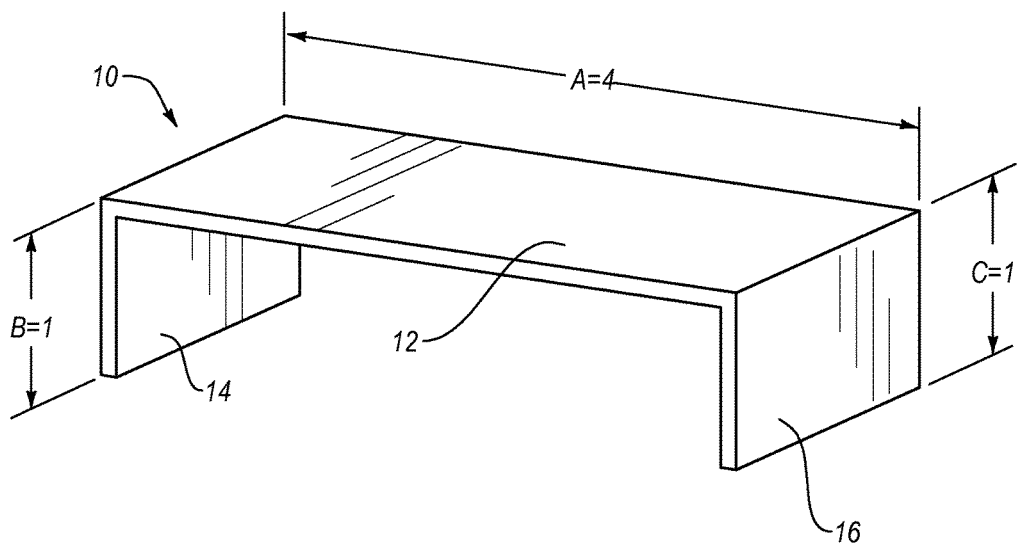
Figure 1C:
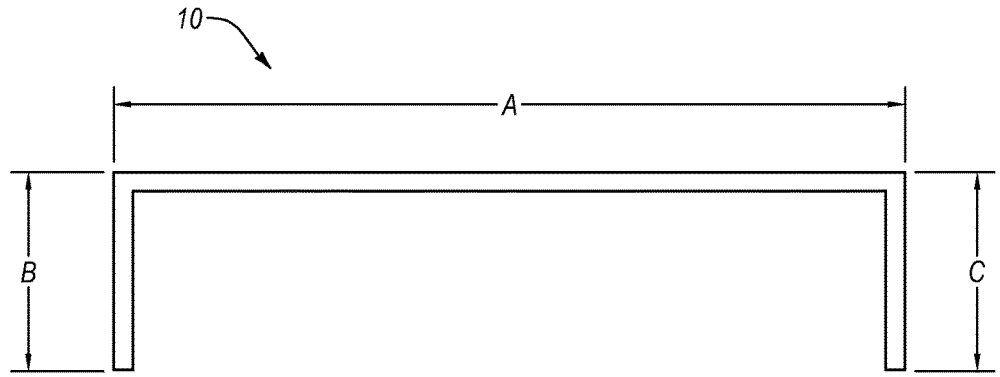
FIG. 1C is a front view the elongate U-shaped member of FIGS. 1A-C.

With reference now to FIGS. 1A-C, the elongate U-shaped member 10 of the present invention comprises: (i) an elongate body member 12; and (ii) first and second parallel elongate leg members 14, 16 extending transversely away from the elongate body member 12, the first and second parallel elongate leg members 14, 16 extending in the same direction away from opposing ends of the elongate body member 12 with space between the first and second parallel elongate leg members 14, 16.

The length A of the elongate U-shaped member 10 is equal to twice the height B of the first side of the elongate U-shaped member, plus twice the height C of the second side of the elongate U-shaped member. Thus, with reference to FIGS. 1A-C, the design ratio is A=2B+2C.

In the embodiment of FIGS. 1A-C, the height B of the first side of the elongate U-shaped member 10 is equal to the height C of the second side of the elongate U-shaped member. Thus, in such an embodiment A=4B=4C.

In the universal design ratio of the present invention, each of the elongate U-shaped members has a design ratio, wherein A=2B+2C, and has the same size. This design ratio and sizing enables various configurations of shelves, tables, consoles and/or bookshelves to be formed in a very efficient space saving manner using this single design. Production, storage, and assembly are vastly more efficient because extensive numbers of furniture assemblies can be produced using multiple copies of a single piece. Thus, the design ratio of A=2B+2C enables extensive numbers and types of shelving, consoles, bookshelves, table pieces, wall units and other shelving configurations using multiple pieces that all have the same common design unit, i.e., an elongate U-shaped member wherein A=2B+2C.

In the embodiment of FIGS. 1A-C, the elongate body member 12 has a width D wherein A=2D such that various useful modular, space saving configurations can be formed. The shelf bodies of the shelf members can be selectively oriented such that the shelf members are parallel to each other, perpendicular to each other, synchronized, and/or offset from each other to form an extensive number of useful modular configurations.

A modular shelving assembly having a universal design ratio of the present invention comprises multiple elongate U-shaped members, each elongate U-shaped member having the design of the elongate U-shaped member 10 of FIGS. 1A-C.

Using this highly useful design ratio of A=2B+2C, extensive varieties of shelving configurations can be formed in a space saving, efficient, and aesthetically pleasing design, as shown in the accompanying figures and as shown in the figures of the provisional application entitled MODULAR SHELVING ASSEMBLY WITH UNIVERSAL DESIGN RATIO, which was filed on Mar. 8, 2013, Ser. No. 61/774,834, which is incorporated herein in its entirety by reference and which shows various shelving designs.

This design ratio is highly useful because it enables shelving pieces having the same design and size to be used in horizontal, vertical, and mixed horizontal and vertical configurations, as shown in the accompanying figures. A variety of different pieces can be formed such that extensive number of pieces having the same common design and size can form unique shelving and console configurations.

Figure 2A:
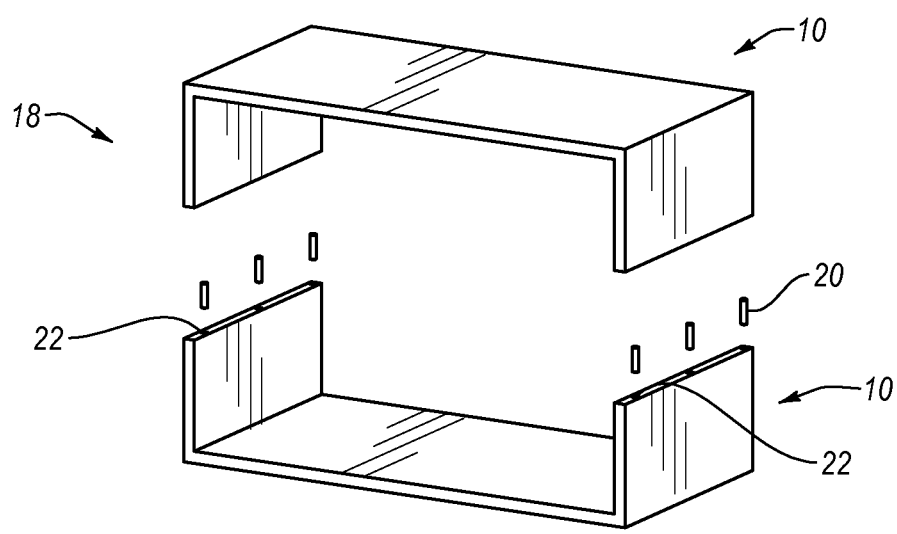
FIG. 2A is a representation of two elongate U-shaped members, each having the design ratio of the elongate U-shaped member of FIGS. 1A-C, being connected together through the use of dowels to form the box frame of FIG. 2B. Each of the U-shaped members has the same design ratio and size
Figure 2B:
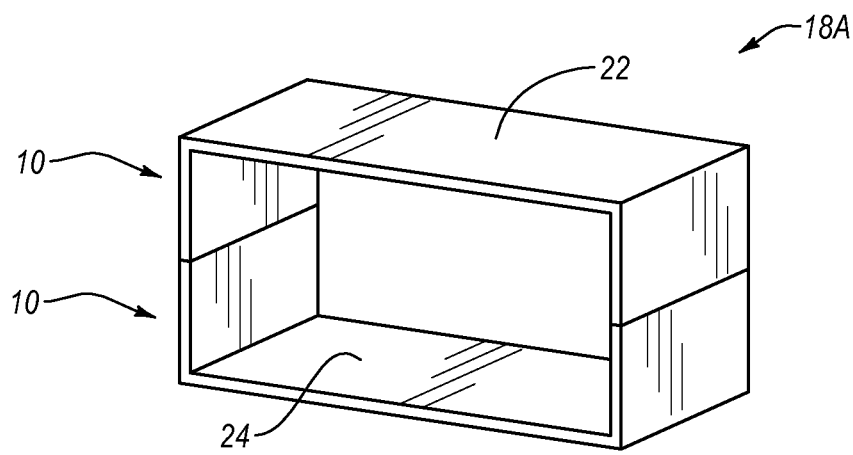

For example, FIGS. 2A-B shows two elongate U-shaped members 10, each having the same the same design ratio of FIGS. 1A-C, and each having the same size, being connected together with the use of dowels 20 which fit into apertures 22 in shelves 10 so as to form a shelf assembly 18A having a simple box frame shelf design having a rectangular appearance. Assembly 18A is shown in FIG. 2B in a horizontal configuration, but can be readily moved to a vertical orientation. This shelf assembly 18A can be used to place items within the box frame shelf design and/or on top of the box frame shelf design. Space is used very efficiently.

Figure 3:
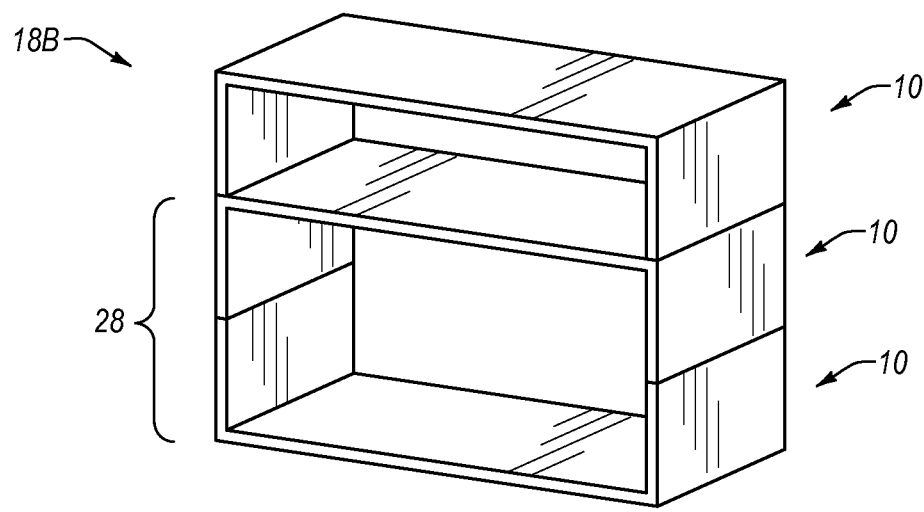
FIG. 3 is a representation of three elongate U-shaped members having the design ratio of the elongate U-shaped member of FIGS. 1A-C being connected together to form a unique shelving assembly. The unique shelving assembly is comprised of the box frame of FIG. 2B in a horizontal position, with a third shelf mounted thereon with the legs pointing downwardly. Each of the U-shaped members has the same design ratio and size.
Figure 4:
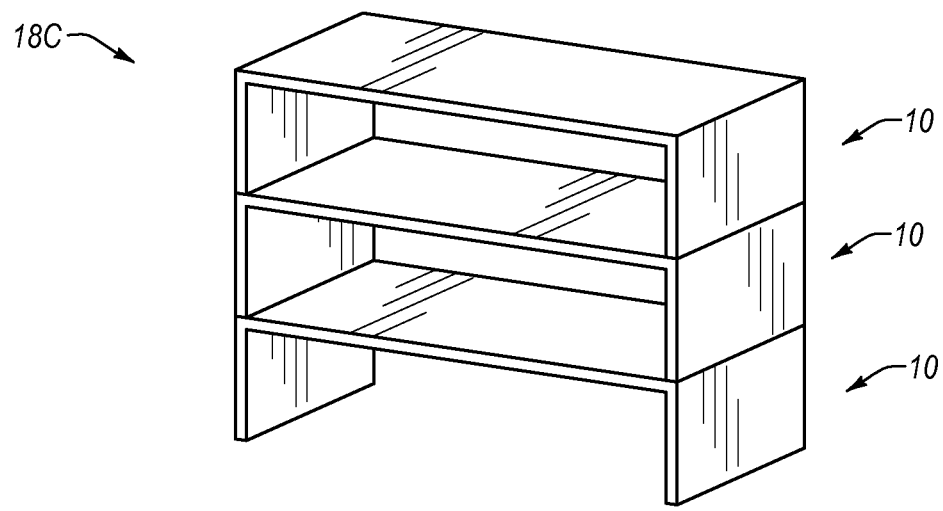
FIG. 4 is yet another view of three elongate U-shaped members having the design ratio of the elongate U-shaped member of FIGS. 1A-C being connected together to form a unique shelving assembly. The three such elongate U-shaped members having the same design ratio and size are positioned one on top of the other with the legs pointing downwardly.

FIGS. 3 and 4 show different types of bookshelves that can be created, each using three U-shaped member, each such U-shaped member having the design ratio of the elongate U-shaped member of FIGS. 1A-C, wherein each of the three shelves have the same sizes.

In the embodiment of FIG. 3, box frame design 28 has the same design of box frame assembly 18A and is formed through the coupling process shown in FIGS. 2A-B. An elongate U-shaped member 10 having the design ratio of FIGS. 1A-C is mounted on top of the rectangular box frame design 28 to form a two-shelf assembly 18B having an upper shelf and a lower horizontally-oriented box frame design. Assembly 18B uses space very efficiently and can be used in a variety of settings.

FIG. 4 also uses three same-sized elongate U-shaped members having the design ratio of FIGS. 1A-C to form a unique horizontal shelving assembly 18C. In FIG. 4, each of the shelves 10 are oriented in a horizontal configuration. The bottom shelf 10 of FIG. 4 is oriented so as to have the appearance and the function of bottom furniture legs such that items can be placed on top of and under the bottom shelf piece 10 and to provide a varied appearance from that of FIG. 3.

Interestingly, both of the shelving assemblies 18B and 18C use the same number of elongate U-shaped members 10, each elongate U-shaped member 10 having the same design as the elongate U-shaped members 10 of FIGS. 1A-C, but using the elongate U-shaped members 10 in different orientations so as to form unique designs.

Figure 5:
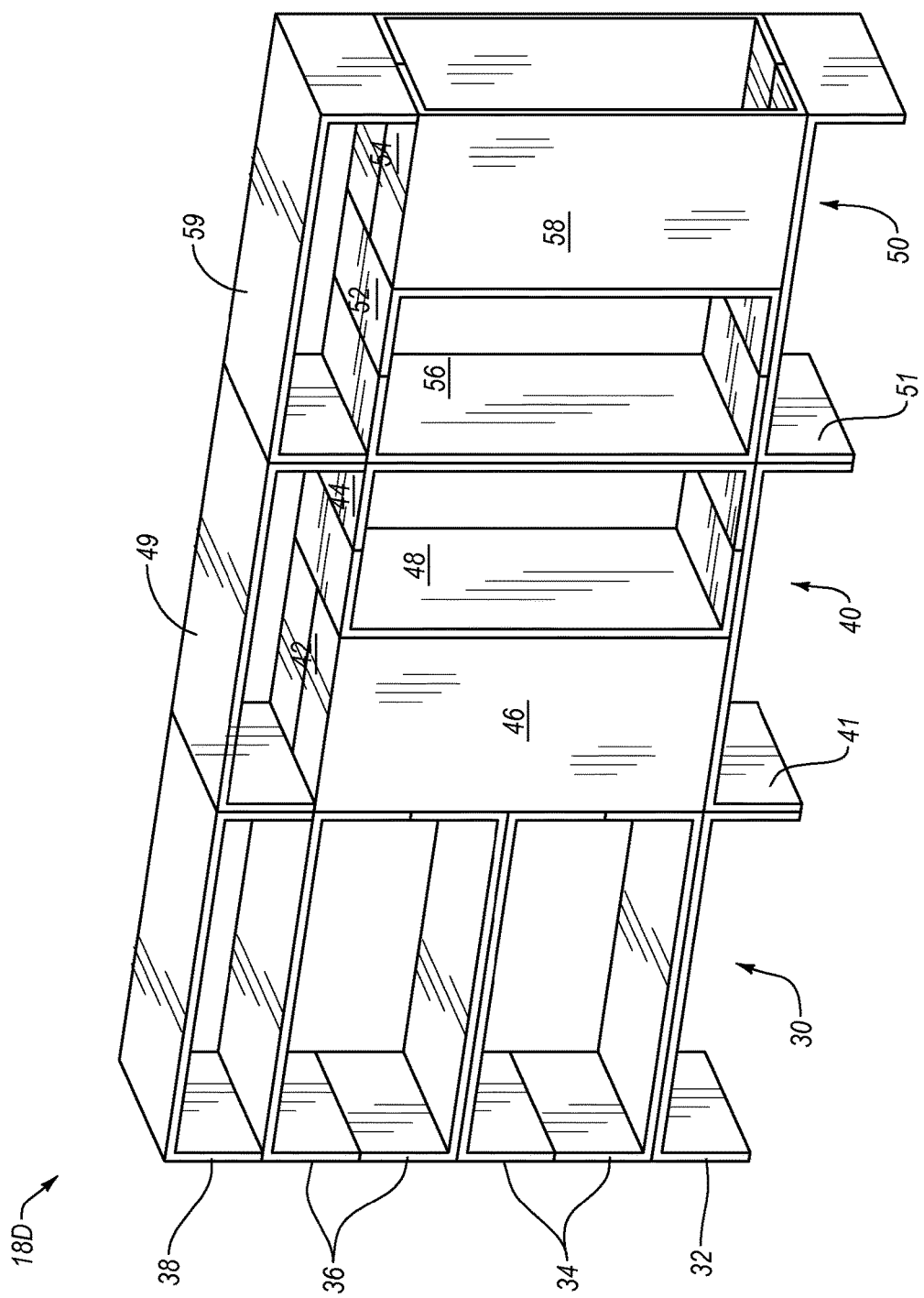
FIG. 5 is a representation of eighteen of the elongate U-shaped members having the design ratio of the elongate U-shaped member of FIGS. 1A-C being connected together to form a unique shelving assembly. Three rows of six of such elongate U-shaped members having the same design ratio and size are stacked in a unique configuration to form a unique bookshelf.

FIG. 5 shows the formation of yet another more complex unique shelving assembly 18D employing eighteen elongate U-shaped members 10, each having the same design of FIGS. 1A-1B and each having the same sizes. The elongate U-shaped members are shown in horizontal and vertical configurations, demonstrating the unique modularity and space-saving quality of the design of FIGS. 1A-1B.

In the embodiment of FIG. 5, three different stacks of elongate U-shaped members, each having the design of member 10 of FIGS. 1A-C achieve three different stack designs. Left stack 30 shows a bottom member 32 in a horizontal configuration with the legs thereof pointed downwardly to form a distinctive, tasteful furniture leg design. Stacked on top of bottom member 30 is a first box frame design 34 (having the same design as assembly 18a of FIG. 2) in a horizontal configuration. Stacked on top of horizontal boxed from design 34 is a second box frame design 36 (also having the same design as assembly 18a of FIG. 2) in a horizontal configuration. Stacked on top of boxed frame design 36 is a top elongate U-shaped member 38 having the same design as the elongate U-shaped member 10 of FIGS. 1A-C. Thus, left stack 30 shows the diverse and space-efficient use of six different elongate U-shaped members, each having the same size and each having the same design as the U-shaped member 10 of FIGS. 1A-C.

Middle stack 40 similarly shows the diverse and space-efficient use of six different elongate U-shaped members, each having the same design as the U-shaped member 10 of FIGS. 1A-C. Middle stack 40 includes two box frame members 42, 44, (each having the same design as assembly 18a of FIG. 2), each being oriented in a vertical configuration and being mounted on top of a bottom U-shaped member 41 that is oriented in a horizontal configuration with the legs thereof pointed downwardly to form a distinctive, tasteful furniture leg design.

Box frame members 42, 44 are oriented such that an outer face 46 of box frame 42 is facing the viewer viewing FIG. 5, while an inner face 48 of box frame 44 is perpendicular thereto. This forms a distinctive useful design in which offsetting perpendicular faces can be used to vary the design of the resulting shelving assembly 18D.

Right stack 50 is similar, with a horizontal member 51 having two vertically oriented box frame design members (each having the same design as assembly 18a of FIG. 2), each being oriented in a vertical configuration and being mounted on top of elongate U-shaped member 51. However, the faces 56, 58 of such members are perpendicular to each other in an opposite manner from that of stack 40. Each of stacks 40 and 50 have a respective upper horizontal members 49, 59 thereon to thereby form unique space saving design.

In left stack 30, six elongate U-shaped members, each having the design of FIGS. 1A-C and each having the same size are oriented horizontally to form a useful shelving configuration. In the central stack 40 of assembly 18C, six members, each having the same design and size as stack 30 are also used, however, in the central stack 40, two of the members are in a horizontal orientation, while four of the members are in a vertical orientation, forming a unique appearance and design. Right stack 50 is similar to central stack 40, except that the vertical box frame designs are offset in a different pattern. Thus, assembly 18C has the appearance of a bookshelf or console having legs, horizontal shelves, vertical shelves, offset faces, and a unique overall furniture configuration. All of this is achieved through the use of multiple copies of the same single design.

The three bottom pieces of assembly 18D form a unique leg design, while the offsetting horizontal and vertical box frames show a varied diverse appearance. Assembly 18D uses space very efficiently and can be formed using eighteen pieces, each having the same elongate U-shaped design of FIGS. 1A-C and each having the same size. All of these variations and options are available in a highly efficient space saving design using the basic design ratio of $A=2B+2C$, such that each of the elongate U-shaped members of stacks 30, 40, and 50 employs this same design ratio to form assembly 18D.

The efficiency of the $A=2B+2C$ design is shown in stacks 40 and 50 of FIG. 5, wherein the footprint of vertically oriented box frame members 46, 48 fits efficiently onto horizontal member 41 and members 56 and 58 fit efficiently onto member 51, for example. Thus, when oriented in a vertical configuration or a horizontal configuration, the design pieces of the present invention efficiently use space in an aesthetically pleasing manner.

The members of assembly 18C can be connected with dowels as shown in FIG. 2A, for example, although it is possible to employ other connection members, such as adhesives, brackets, hooks or other utilitarian feature within various portions of the shelving assemblies of the present invention.

Figure 6:
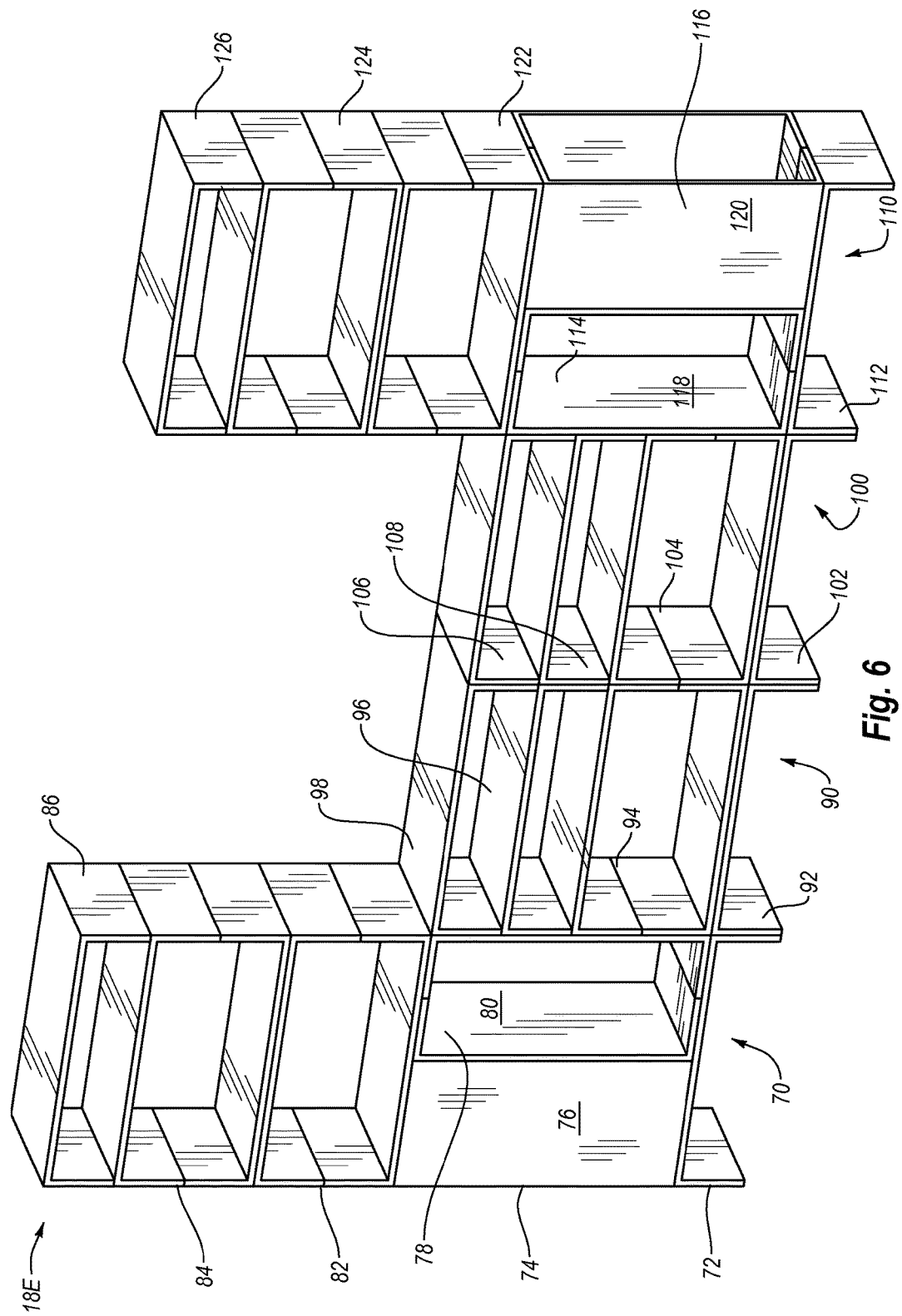
FIG. 6 is yet another furniture assembly using an extensive number of elongate U-shaped members having the design ratio of the elongate U-shaped member of FIGS. 1A-C being connected together to form a unique media console. Four rows having different numbers of elongate U-shaped members having the same design ratio and size are stacked in a unique configuration to form the media console.

FIG. 6 shows yet another furniture assembly 18E having stacks 70, 90, 100, 110 that have various interesting variations. Assembly 18E is built entirely using elongate U-shaped members having the same design ratio of FIG. 1A-C and each having the same size. As shown, the face of the bodies of the shelf members are sometimes shown facing the user and sometimes shown perpendicular to the user, thereby forming unique and personal designs.

For example side stack 70 comprises two vertical oriented box frame designs 74, 78 having offset faces 76, 80 for a variety appearance and function, with horizontal box frame designs 82, 84 mounted thereabove and with piece 86 on top. Central stack 90 has a horizontal piece 92 with a horizontal box frame design 94 thereon. Two horizontal pieces 96, 98 are thereabove to form interesting shelf designs. Similarly, central stack 100 has a horizontal piece 102 with a horizontal box frame design 104 thereon. Two horizontal pieces 108, 106 are thereabove to form interesting shelf designs. Side stack 110 comprises two vertical oriented box frame designs 114, 116 having offset faces 118, 120 for a variety appearance and function, with horizontal box frame designs 122, 124 mounted thereabove and with piece 126 mounted on top.

Figure 7A:
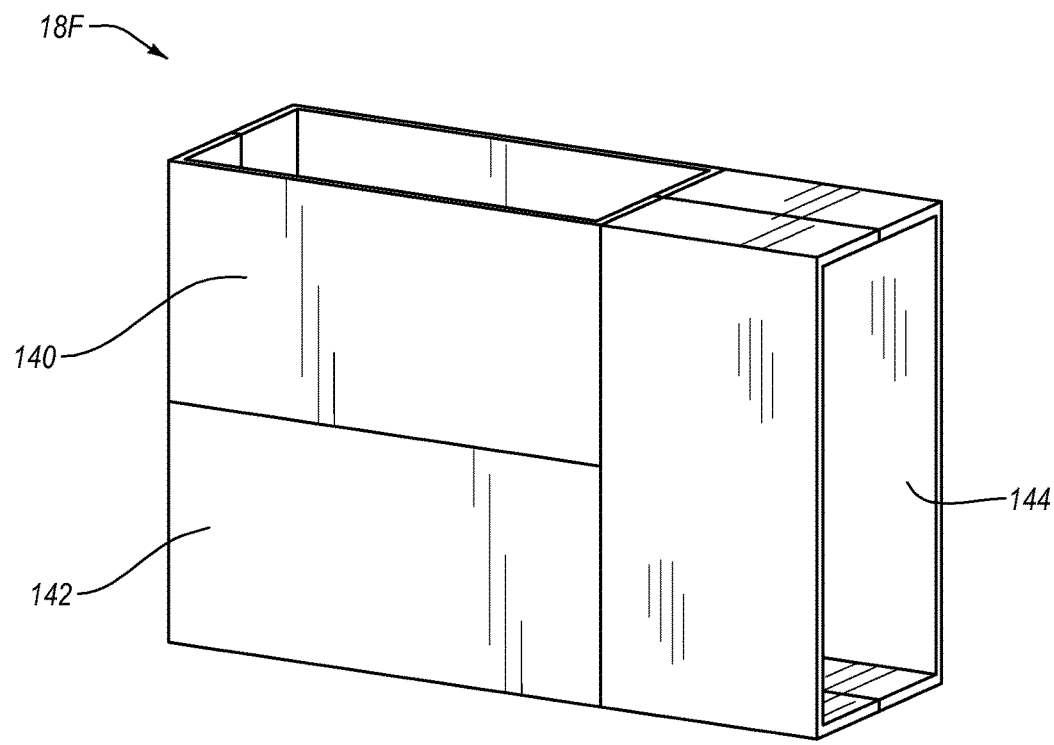
FIG. 7A shows a unique container assembly having six shelf members having the design ratio of the elongate U-shaped member of FIGS. 1A-C (and each U-shaped member having the same size) being connected together to form a unique container assembly.
Figure 7B:
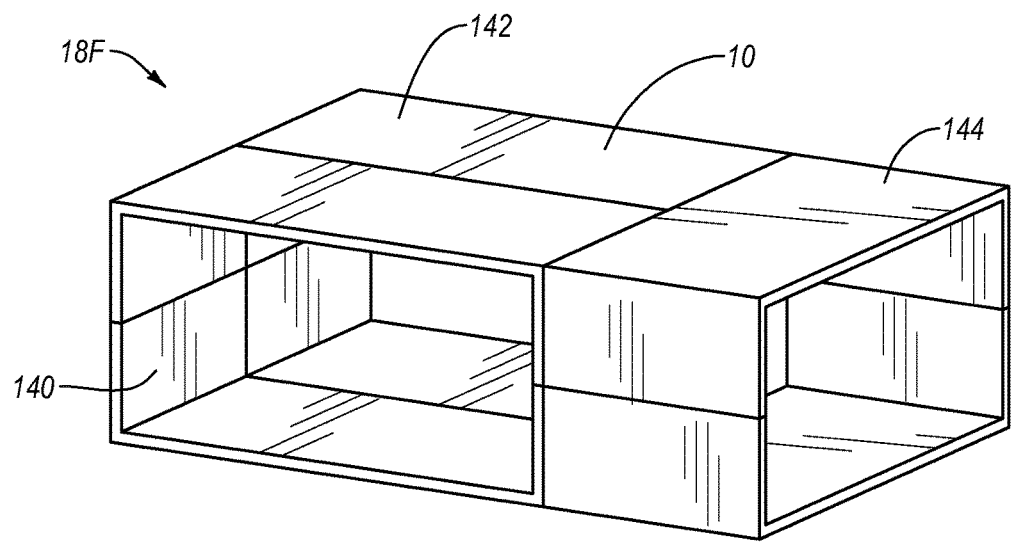
FIG. 7B shows the assembly of FIG. 7A in a horizontal position so as to form a coffee table.

With reference now to FIGS. 7A and 7B, yet another unique assembly, 18F is shown, wherein assembly 18F is formed using six elongate U-shaped members having the design of FIGS. 1A-C and having the same size to form a storage unit in FIG. 7A and a coffee table in FIG. 7B. Assembly 18F is highly useful, space efficient and convenient to set up, and is made only with elongate U-shaped members having the same size and the same design ratio as the elongate U-shaped member 10 of FIGS. 1A-C. As shown, the footprint of pieces 140, 142, fits efficiently against piece 144, such that space is used efficiently and elegantly in this design.

Figure 8:
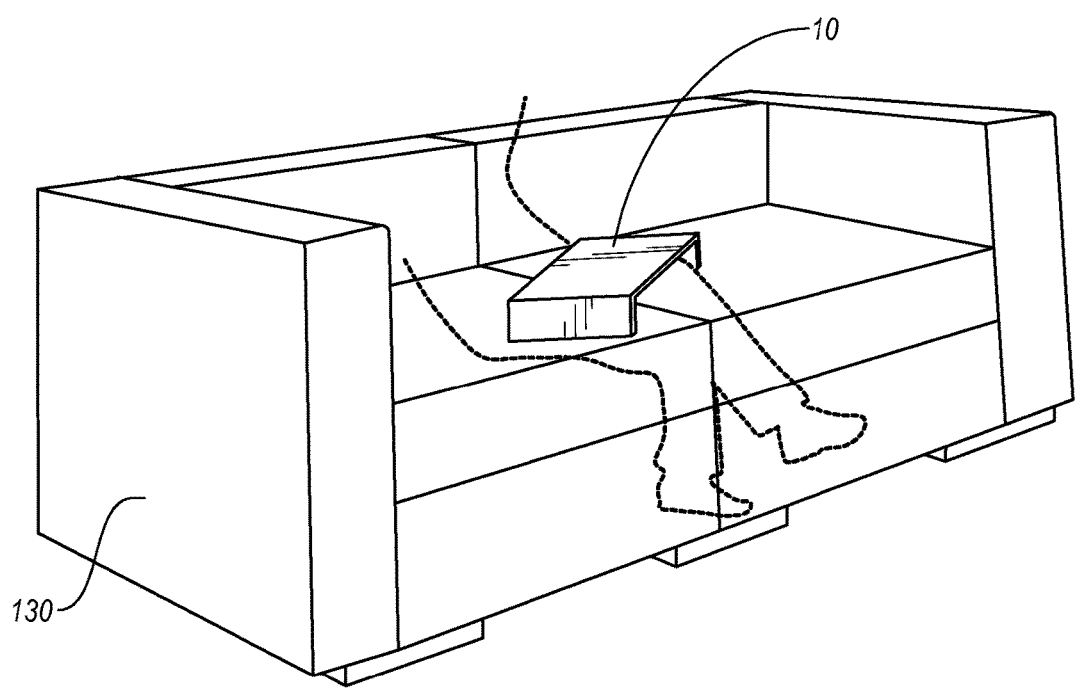
FIG. 8 shows a lap table having the design of the elongate U-shaped member of FIGS. 1A-C.
Figure 9:
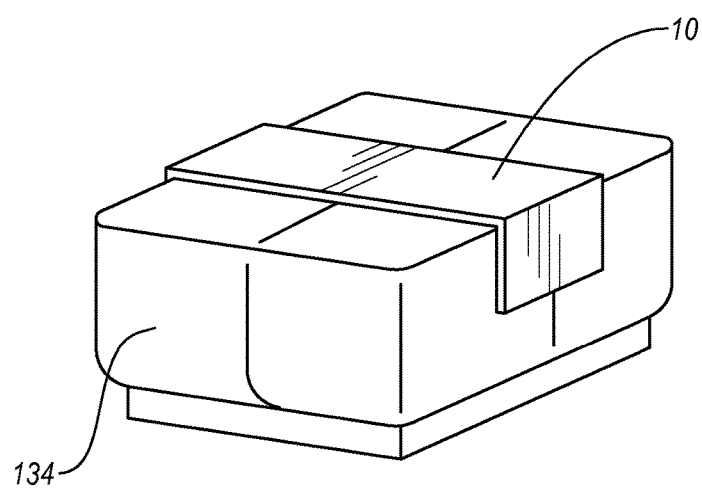
FIG. 9 shows an ottoman table having the design of the elongate U-shaped member of FIGS. 1A-C.

With reference now to FIGS. 8 and 9, these figures show that elongate U-shaped member 10 of FIGS. 1A-C also has utilitarian features on its own as a table.

Because of the unique design ratio of A=2B+2C of FIGS. 1A-C, a variety of different configurations and assemblies can be formed. As shown throughout the accompanying figures, by using a furniture assembly having the design of A=2B+2C, two shelves can form a rectangular box frame which can either be used horizontally or can be used vertically. The vertical box frame can be mounted either such that the face shows outwardly or such that a side view of the face is only seen. As a result, a variety of different configurations can be formed using the ratio A=2B+2C for the design of each member.

Figure 10:
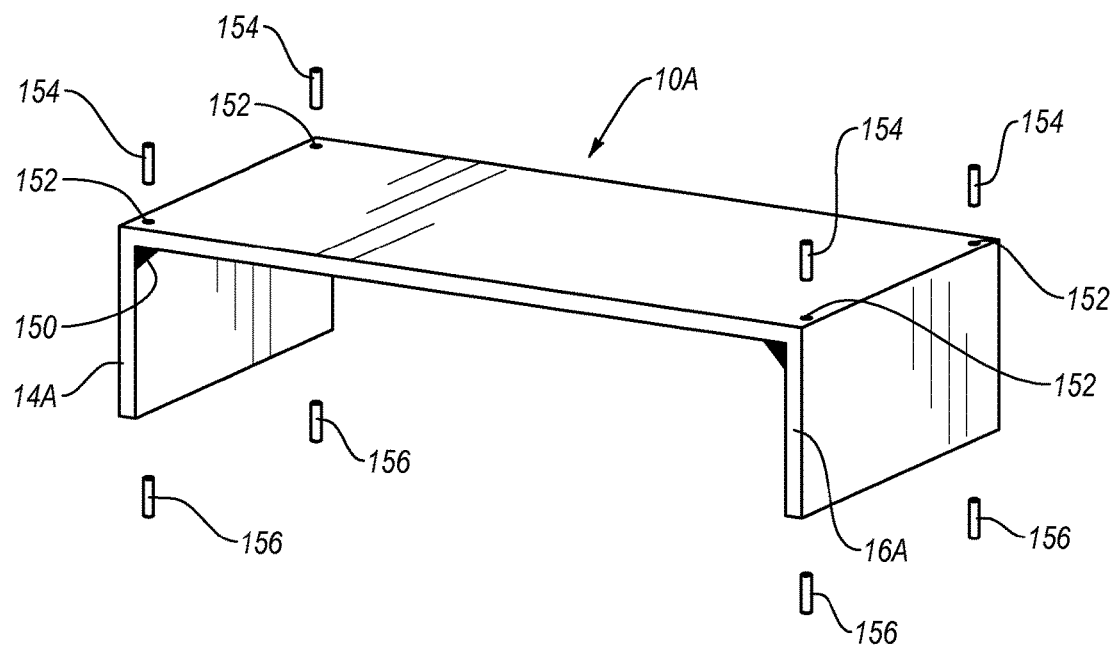
FIG. 10 shows an alternate U-shaped member of the present invention having corner braces.

FIG. 10 shows an alternate elongated U-shaped member 10A of the present invention having corner braces 150. In this embodiment, braces 150 between the corners can be shown and used, braces 150 providing additional strength and support to legs 14A, 14B. Furthermore, as shown, upper apertures 152 can be used to mount dowels 154, while lower dowels 156 can be mounted in lower apertures in member 10A such that the various pieces can be held together In one embodiment, a glue or other adhesive is used to maintain the dowels in respective holes. Also, clamps and other mechanisms can be used to retain shelving pieces together and/or to connect them to the wall or other furniture pieces.

When one stacks or connects more than one elongate U-shaped member 10 together, an array of useful shelving solutions are achieved. The specific dimensional relationships of A=2B+2C and A=2D achieve maximum flexibility using only one single design i.e. shelf 10 of FIGS. 1A-C. These relationships separately or together can produce predictable and uniform configuration with ease in the significant recognizable and useful ways.

Only one mold is required in manufacturing to produce an elongate U-shaped member having the same size and design ratio that can result in vast arrays of shelving designs. Each of the shelves, tables, consoles and units shown in the enclosed figures are made with shelves having the design of the member 10 of FIGS. 1A-C.

Thus, the ratio of A=2B+2C is a highly useful ratio when designing modular furniture such that pieces can be created to stack with respect to each other, onto each other, next to each other, in a horizontal, vertical, combined horizontal vertical offset or a variety of other configurations, because the shapes that are formed are complimentary to each other and provide a vast number of useful relationships.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular shelving system comprising at least four U-shaped members that each have the same design ratio, wherein each of the U-shaped members comprises an elongate U-shaped member comprising:
   (i) an elongate body member having a flat top surface; and
   (ii) first and second parallel elongate leg members extending transversely away from the elongate body member at 90° therefrom, the first and second parallel elongate leg members being of the same length, and extending in the same direction away from opposing ends of the elongate body member with space between the first and second parallel elongate leg members, the elongate U-shaped member having a length A, a first side having a height B, and a second side having a height C, wherein the length A of the elongate U-shaped member is equal to twice the height B of the first side of the elongate U-shaped member plus twice the height C of the second side of the elongate U-shaped member, such that the modular shelving system has a design ratio of A=2B+2C;
   wherein the at least four U-shaped members include two connected U-shaped members with the elongate body member vertically oriented, and two horizontally connected U-shaped members with the elongate body member horizontally oriented to form said shelving system.

2. The system of claim 1 wherein the design ratio of A=2B+2C enables various configurations of shelving assemblies to be formed using multiple U-shaped members that each have the same design ratio and size.

3. The system of claim 1, wherein the elongate body member has a width D and wherein A=2D, such that various modular configurations can be formed.

4. The system of claim 1, wherein the elongate U-shaped members can be selectively oriented such that shelf members defined by the U-shaped members are parallel to each other, perpendicular to each other, and/or offset from each other to form modular configurations selected from the group consisting of: (i) a horizontal box frame of two U-shaped members oriented horizontally, (ii) a vertical box frame of two U-shaped members oriented vertically, and (iii) a combination of horizontal box frames and vertical box frames.

5. The system of claim 1 further comprising connection members for selectively connecting the at least four U-shaped members together.

6. The system of claim 1, wherein each U-shaped member in the modular shelving system has the same design ratio and size.

7. A modular shelving system comprising at least four U-shaped members having the same design ratio and size, wherein each of the U-shaped members comprises an elongate U-shaped member comprising:
   (i) an elongate body member having a flat top surface; and
   (ii) first and second parallel elongate leg members extending transversely away from the elongate body member at 90° therefrom, the first and second parallel elongate leg members being of the same length and extending in the same direction away from opposing ends of the elongate body member with space between the first and second parallel elongate leg members, the elongate U-shaped member having a length A, a first side having a height B, a second side having a height C, and a width D, wherein the length A of the elongate U-shaped member is equal to twice the height B of the first side of the elongate U-shaped member plus twice the height C of the second side of the elongate U-shaped member, and A is equal to twice the width D such that the modular shelving system has a design ratio where A=2B+2C=2D; and
   (iii) connection members for connecting the at least four U-shaped members together;
   wherein the at least four U-shaped members include:
      two U-shaped members which can be connected together with leg members oriented towards one another with the elongate body member of each vertically oriented to form a vertical box frame; and
      two U-shaped members which can be connected together with leg members oriented towards one another with the elongate body member of each horizontally oriented to form a horizontal box frame;
      such that when the vertical box frame is positioned adjacent to the horizontal box frame, the design ratio of each U-shaped member forces outer surfaces of the vertical box frame to be flush with outer surfaces of the horizontal box frame.

8. The system of claim 7, wherein the design ratio enables various configurations of shelving assemblies to be formed using multiple U-shaped members that each have the same design ratio and size, and wherein the modular shelving system comprises at least six elongate U-shaped members having the same design ratio and size.

9. The system of claim 7, wherein when the horizontal box frame is stacked on top of another identical horizontal box frame, and wherein when the vertical box frame is positioned adjacent to the horizontal box frames, the design ratio of each U-shaped member forces outer surfaces of the vertical box frame to be flush with outer surfaces of the horizontal box frames.

10. The system of claim 7, wherein the shelving system comprises at least four elongate U-shaped members having the same design ratio and size that can be selectively oriented such that shelf members defined by the U-shaped members are parallel to each other, perpendicular to each other, and/or offset from each other to form modular configurations.

11. The system of claim 7, wherein when six of the U-shaped members are provided of the same size and same design ratio, with the six U-shaped members forming three pairs, with first and second pairs connected to form first and second horizontal box frames with the first horizontal box frame stacked on top of the second horizontal box frame, and the third pair connected to form a vertical box frame, the design ratio of each U-shaped member forces outer surfaces of the vertical box frame to be flush with outer surfaces of the first and second horizontal box frames when the vertical box frame is positioned adjacent the stacked first and second horizontal box frames.

12. The system of claim 7, wherein the system has between four to thirty U-shaped members, each having the same design ratio and size.

13. A modular shelving assembly comprising at least two U-shaped members having the same design ratio and size, wherein each of the U-shaped members comprises an elongate U-shaped member comprising:
   (i) an elongate body member having a flat top surface; and
   (ii) first and second parallel elongate leg members extending transversely away from the elongate body member at 90° therefrom, the first and second parallel elongate leg members being of the same length and extending in the same direction away from opposing ends of the elongate body member with space between the first and second parallel elongate leg members, the elongate U-shaped member having a length A, a first side having a height B, and a second side having a height C, wherein the length A of the elongate U-shaped member is equal to twice the height B of the first side of the elongate U-shaped member plus twice the height C of the second side of the elongate U-shaped member, such that A=2B+2C;
   wherein each elongate body member has a width D and wherein A=2D; and
   wherein the height B of the first side of each of the elongate U-shaped members is equal to the height C of the second side of each of the elongate U-shaped members, such that A=4B=4C=2D;
   such that when six of the U-shaped members are provided of the same size and same design ratio, with the six U-shaped members forming three pairs, with first and second pairs connected to form first and second horizontal box frames with the first horizontal box frame stacked on top of the second horizontal box frame, and the third pair connected to form a vertical box frame, the design ratio of each U-shaped member forces outer surfaces of the vertical box frame to be flush with outer surfaces of the first and second horizontal box frames when the vertical box frame is positioned adjacent the stacked first and second horizontal box frames.

14. An assembly as recited in claim 13, wherein the shelving assembly comprises three horizontally oriented elongate U-shaped members stacked on top of each other.

15. An assembly as recited in claim 13, wherein the assembly comprises three horizontally oriented elongate U-shaped members, wherein legs of two of the U-shaped members are connected to each other to form a box frame assembly and wherein a third U-shaped member is stacked on top of the box frame assembly.

16. A method for forming a modular shelving system, the method comprising:
   (i) providing a plurality of U-shaped members having the same design ratio and size, wherein each of the U-shaped members comprises an elongate U-shaped member comprising:

a. an elongate body member having a flat top surface; and
b. first and second parallel elongate leg members extending transversely away from the elongate body member at 90° therefrom, the first and second parallel elongate leg members being of the same length and extending in the same direction away from opposing ends of the elongate body member with space between the first and second parallel elongate leg members, the elongate U-shaped member having a length A, a first side having a height B, and a second side having a height C, wherein the length A of the elongate U-shaped member is equal to twice the height B of the first side of the elongate U-shaped member plus twice the height C of the second side of the elongate U-shaped member, such that A is equal to 2B+2C;

such that when six of the elongate U-shaped members are provided of the same size and same design ratio, with the six elongate U-shaped members forming three pairs, with first and second pairs connected to form first and second horizontal box frames with the first horizontal box frame stacked on top of the second horizontal box frame, and the third pair connected to form a vertical box frame, the design ratio of each U-shaped member forces outer surfaces of the vertical box frame to be flush with outer surfaces of the first and second horizontal box frames when the vertical box frame is positioned adjacent the stacked first and second horizontal box frames; and (ii) coupling the plurality of elongate U-shaped members to each other to form a configuration in which some of the elongate U-shaped members are oriented horizontally and some of the elongate U-shaped members are oriented vertically.

17. A method as recited in claim 16, wherein an assembly comprising the plurality of U-shaped members has between two to thirty U-shaped members, each having the same design ratio and size.

18. A modular shelving assembly comprising at least four U-shaped members, wherein each of the U-shaped members has the same design ratio and the same size, and wherein each of the U-shaped members comprises an elongate U-shaped member comprising:
  (i) an elongate body member having a flat top surface; and
  (ii) first and second parallel elongate leg members extending transversely away from the elongate body member at 90° therefrom, the first and second parallel elongate leg members being of the same length and extending in the same direction away from opposing ends of the elongate body member with space between the first and second parallel elongate leg members, the elongate U-shaped member having a length A, a first side having a height B, and a second side having a height C, wherein the length A of the elongate U-shaped member is equal to twice the height B of the first side of the elongate U-shaped member plus twice the height C of the second side of the elongate U-shaped member, such that A=2B+2C;
  (iii) wherein the at least four elongate U-shaped members can be oriented such that shelf members defined by the U-shaped members are parallel to each other, perpendicular to each other, and/or offset from each other to form configurations selected from the group consisting of (i) a horizontal box frame of two U-shaped members oriented horizontally, (ii) a vertical box frame of two U-shaped members oriented vertically, and (iii) a combination of horizontal box frames and vertical box frames.

19. An assembly as recited in claim 18, wherein when six of the U-shaped members are provided of the same size and same design ratio, with the six U-shaped members forming three pairs, with first and second pairs connected to form first and second horizontal box frames with the first horizontal box frame stacked on top of the second horizontal box frame, and the third pair connected to form a vertical box frame, the design ratio of each U-shaped member forces outer surfaces of the vertical box frame to be flush with outer surfaces of the first and second horizontal box frames when the vertical box frame is positioned adjacent the stacked first and second horizontal box frames.

20. The assembly of claim 18, wherein the elongate body member has a width D and wherein A=2D.

21. The assembly of claim 13, wherein a first pair of upper apertures are formed in the elongate body member over the first elongate leg member, and a second pair of upper apertures are formed in the elongate body member over the second elongate leg member, the assembly further comprising dowels for mounting into the first and second pairs of upper apertures, wherein the upper apertures are each disposed an equal distance from a nearest adjacent edge of the elongate body member.

22. The system of claim 16, wherein the modular shelving system comprises at least six U-shaped members of the same size and design ratio, wherein:
  a first pair of the U-shaped members can be oriented with the elongate body members horizontally oriented with the leg members connected to one another to form a first horizontal box frame;
  a second pair of the U-shaped members can be oriented with the elongate body members horizontally oriented with the leg members connected to one another to form a second horizontal box frame, the second horizontal box frame being stackable over the first horizontal box frame; and
  a third pair of the U-shaped members can be oriented with the elongate body members vertically oriented with the leg members connected to one another to form a vertical box frame;
  such that when the vertical box frame is positioned adjacent to the stacked first and second horizontal box frames, the design ratio of each U-shaped member forces outer surfaces of the vertical box frame to be flush with outer surfaces of the first and second horizontal box frames.

23. A method for forming a modular shelving system, the method comprising:
  (i) providing at least four U-shaped members having the same design ratio and size, wherein each of the U-shaped members comprises an elongate U-shaped member comprising:
    a. an elongate body member having a flat top surface; and
    b. first and second parallel elongate leg members extending transversely away from the elongate body member at 90° therefrom, the first and second parallel elongate leg members being of the same length and extending in the same direction away from opposing ends of the elongate body member with space between the first and second parallel elongate leg members, the elongate U-shaped member having a length A, a first side having a height B, and a second side having a height C, wherein the length A of the elongate U-shaped member is equal to twice the height B of the first side of the elongate U-shaped member plus twice the height C of the second side of the elongate U-shaped member, such that A is equal to 2B+2C;

wherein the at least four elongate U-shaped members can be oriented such that shelf members defined by the U-shaped members are parallel to each other, perpendicular to each other, and/or offset from each other to form configurations selected from the group consisting of (A) a horizontal box frame of two U-shaped members oriented horizontally, (B) a vertical box frame of two U-shaped members oriented vertically, and (C) a combination of horizontal box frames and vertical box frames; and (ii) coupling the at least four elongate U-shaped members to each other to form a configuration selected from the group consisting: of (A) a horizontal box frame of two U-shaped members oriented horizontally, (B) a vertical box frame of two U-shaped members oriented vertically, and (C) a combination of horizontal box frames and vertical box frames.

24. The method of claim 23, further comprising providing connection members for selectively connecting the at least four U-shaped members together.

\* \* \* \* \*

UNITED STATES PATENT AND TRADEMARK OFFICE
CERTIFICATE OF CORRECTION

PATENT NO. : 9,603,448 B2
APPLICATION NO. : 13/834284
DATED : March 28, 2017
INVENTOR(S) : Nelson et al.

Page 1 of 2

It is certified that error appears in the above-identified patent and that said Letters Patent is hereby corrected as shown below:

In the Specification

Column 1
Line 20, change "consuls" to –consoles–
Line 28, remove [both]
Line 31, change "the" to –they–

Column 2
Line 50, change "have" to –having–

Column 3
Line 19, change "size" to –size.–

Column 5
Line 15, change "member" to –members–

Column 6
Line 65, change "feature" to –features–

Column 7
Line 11, change "variety appearance and function" to –variety of appearances and functions–
Lines 20-21, change "variety appearance and function" to –variety of appearances and functions–
Line 54, change "14B" to –16A–
Line 57, change "together" to –together.–

Column 8
Line 2, change "configuration" to –configurations–

Signed and Sealed this
Ninth Day of October, 2018

Andrei Iancu
*Director of the United States Patent and Trademark Office*

In the Claims

Column 12
Line 27, change "16" to –7–